(12) United States Patent
Makiuchi et al.

(10) Patent No.: US 7,476,996 B2
(45) Date of Patent: Jan. 13, 2009

(54) RESOLVER EXTERNAL CONDUCTOR FIXING STRUCTURE

(75) Inventors: Hiromi Makiuchi, Nagano (JP); Hiroyuki Tsukashima, Aichi (JP)

(73) Assignees: Tamagawa Seiki Kabushiki Kaisha, Nagano (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 11/596,117

(22) PCT Filed: Oct. 7, 2005

(86) PCT No.: PCT/JP2005/018644

§ 371 (c)(1),
(2), (4) Date: Nov. 9, 2006

(87) PCT Pub. No.: WO2006/038693

PCT Pub. Date: Apr. 13, 2006

(65) Prior Publication Data

US 2008/0036315 A1 Feb. 14, 2008

(30) Foreign Application Priority Data

Oct. 7, 2004 (JP) .............................. 2004-295065

(51) Int. Cl.
*H02K 11/00* (2006.01)

(52) U.S. Cl. ..................................................... 310/71

(58) Field of Classification Search ................... 310/71, 310/254, 68 B
See application file for complete search history.

(56) References Cited

U.S. PATENT DOCUMENTS

| 5,629,574 | A | * | 5/1997 | Cognetti et al. | ............... 310/71 |
| 6,028,383 | A | * | 2/2000 | Ohshita | ....................... 310/71 |
| 6,750,577 | B2 | * | 6/2004 | Mimura | ....................... 310/71 |
| 2003/0222521 | A1 | | 12/2003 | Mimura | |
| 2005/0280320 | A1 | * | 12/2005 | Utsumi et al. | ................. 310/43 |

FOREIGN PATENT DOCUMENTS

| EP | 1 367 692 | | 12/2003 |
| JP | 7-308046 | | 11/1995 |
| JP | 2001-330472 | * | 11/2001 |
| JP | 2002-272050 | | 9/2002 |
| JP | 2003-307437 | | 10/2003 |
| JP | 2003-344107 | | 12/2003 |

* cited by examiner

*Primary Examiner*—Nguyen N Hanh
(74) *Attorney, Agent, or Firm*—Wenderoth, Lind and Ponack, L.L.P.

(57) ABSTRACT

A resolver external conductor fixing structure which includes a connection body having a plurality of leads, and a terminal pin holding part formed on a portion of an insulation cover for an annular stator. The terminal pin holding part and the connection body are configured to detachably engage to allow the leads to be disconnected during assembly of a resolver and connected when assembly is complete.

5 Claims, 6 Drawing Sheets

RESOLVER EXTERNAL CONDUCTOR FIXING STRUCTURE

BACKGROUND OF THE INVENTION

1. Field of the Invention

The present invention relates to a resolver external conductor fixing structure, and more particularly, to a novel improvement for making a connection body with leads that are detachably connectable to a terminal pin holding part which includes terminal pins. Lead connecting portions of the terminal pins are exposed outside of the terminal pin holding part so that the leads of the connection body can be connected with the lead connecting portions after the assembly of the resolver.

2. Description of the Related Art

A conventional example of the above-mentioned type of resolver external conductor fixing structure is shown in FIGS. 5 and 6, and described in U.S. Pat. No. 6,028,383.

In FIGS. 5 and 6, reference numeral 1 denotes a ring-shaped stator having a plurality of salient poles 2 which protrude inwardly. First and second ring-shaped insulating covers 5 and 6, each of which has a shape covering the respective salient poles 2, are provided on first and second end surfaces 3 and 4 of the ring-shaped stator 1.

The respective salient poles 2 are wound with stator coils 7 through the respective ring-shaped insulating covers 5 and 6. A terminal pin holding part 8 extended in a radial direction is integrally formed in a part of an outer edge of the first ring-shaped insulating cover 5 which is one of the respective ring-shaped insulating covers 5 and 6.

Each of the coil connecting parts 9a protruding above one end of each of terminal pins 9, which are integrally provided in the terminal pin holding part 8 by insert molding or the like, is connected with bundled end wires of the stator coils 7.

As shown in the cross sectional view of FIG. 6, each of the terminal pins 9 is bent into an L-shape. A lead connecting portion 10, which includes a swaging part protruding in a lateral direction of the other end of each of the terminal pins 9, is connected with leads 11. The lead connecting portion 10 is tightly connected with the leads 11 by the swaging part.

Due to the above-described construction, the conventional resolver external conductor fixing structure has the following problems.

First, in a process for manufacturing the resolver, the stator is supplied to an assembly line in a state in which the leads are connected to a lead connecting portion of respective terminal pins by, for example, the application of a pressure. In a final step, after winding is completed, end wires of the stator coils are bundled and connected with the coil connecting parts. Therefore, the stator is moved on the assembly line in a state in which the leads are continuously connected with the lead connecting portion in all steps including a winding step, so that handling is inconvenient. This significantly hinders an improvement in productivity.

In addition, when the number of types of leads is large, it is necessary to prepare various ring-shaped stators provided with various leads based on the different lengths and types of the leads. Therefore, preparation, distinction, and the like are complicated, and the number of types of jigs in the line and the number of types of equipment attachment jigs increase. This is a large problem with respect to productivity.

It is very difficult to perform automatic production according to specifications based on a customer's request.

SUMMARY OF THE INVENTION

A resolver external conductor fixing structure according to the present invention includes: an insulating cover including first and second ring-shaped insulating covers formed on first and second end surfaces of a ring-shaped stator by integral molding; a terminal pin holding part integrally formed with a part of the insulating cover; a connection body which is detachable from the terminal pin holding part, and includes leads; terminal pins provided in the terminal pin holding part; a coil connecting part formed in one end of each of the terminal pins; and a lead connecting portion formed in the other end of each of the terminal pins, wherein the lead connecting portions of the terminal pins are exposed the terminal pin holding part, and the leads are connected with the lead connecting portions when the connection body is connected with the terminal pin holding part.

Further, in the structure, the coil connecting part is extended from a side of the first end surface of the ring-shaped stator in an axial direction; and the lead connecting portion is extended toward a side of the second end surface of the ring-shaped stator in an axial direction. Further, in the structure, each of the terminal pins is bent stepwise. Further, in the structure, an outer surface and an inner surface of each of the lead connecting portions are exposed the terminal pin holding part and can be connected with each of the leads. Further, in the structure, the lead connecting portion has a flat plane shape. Further, in the structure, the connection body comprises a plurality of lead guide holes formed therein, for guiding the leads.

The resolver external conductor fixing structure according to the present invention has the above-mentioned structure. Therefore, the following effects can be obtained.

(1) The connection body with which the leads are connected is detachable from the terminal pin holding part. The stator coils are bundled and connected with the terminal pins. In a final stage, the connection body is mounted on the terminal pin holding part to connect the leads with the lead connecting portions. Therefore, while the ring-shaped stator moves on an assembly line, the leads and the like are not connected. Thus, there is no trouble during assembly, with the result that production efficiency is improved and automation is facilitated.

(2) The assembly can be performed without depending on a particular type of a lead, so that the final assembly is easy and parts control is significantly facilitated. The leads are fit in a final step, so line facilities can be simplified, and changes in plan due to a change in harness can be minimized by unifying management of harness parts.

(3) Each of the lead connecting portions has a plate shape, so the leads can be connected with both surfaces thereof. Even after a resolver is attached to a device, the leads can be connected with the lead connecting portions. Therefore, the assembly of the device to which the resolver is attached can be significantly facilitated and simplified.

DETAILED DESCRIPTION OF THE INVENTION

An object of the present invention is to provide lead connecting portions in openings of a terminal pin holding part to enable connection of leads with the lead connecting portions after stator coils are connected with terminal pins, thereby significantly improving the assembly convenience of a resolver.

A resolver external conductor fixing structure according to a preferred embodiment of the present invention described below with reference to the accompanying drawings.

Figure 5:
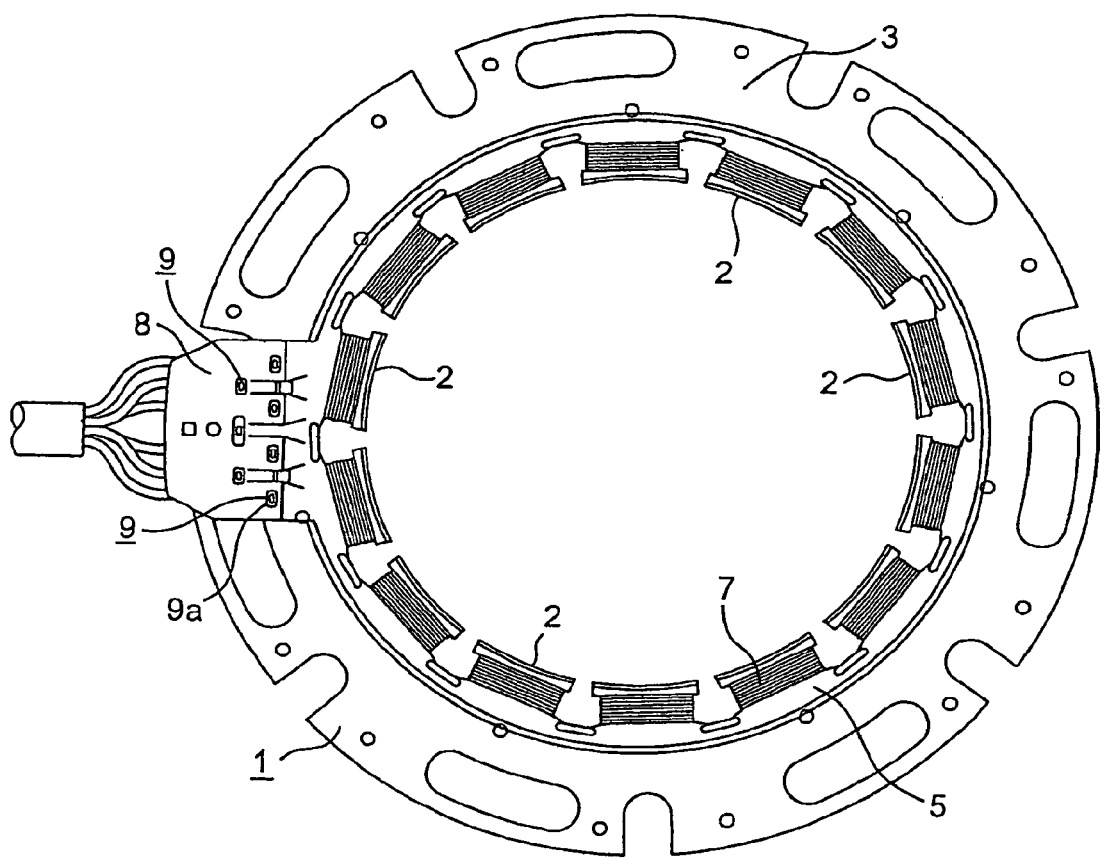
FIG. 5 is a plan view of a conventional resolver external conductor fixing structure.
Figure 6:
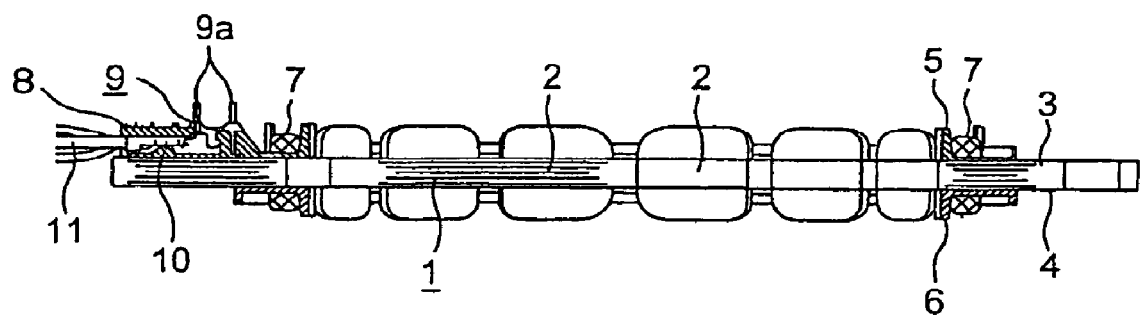
FIG. 6 is a cross sectional view of the structure illustrated in FIG. 5.

In the following description, the same reference symbols are used in FIGS. 5 and 6 are used to identify parts of the present invention which are identical or equivalent to those in the conventional example.

Figure 1:
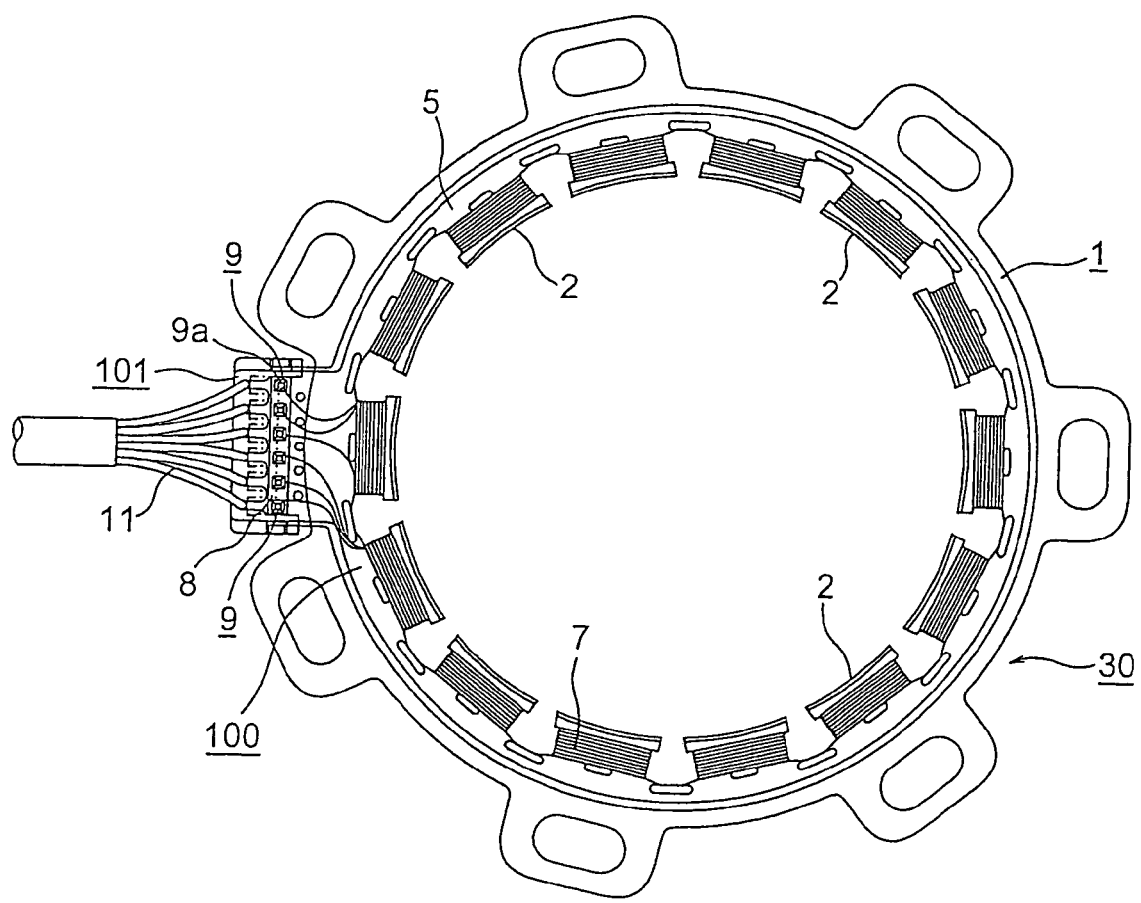
FIG. 1 is a plan view showing a resolver external conductor fixing structure according to the present invention.
Figure 2:
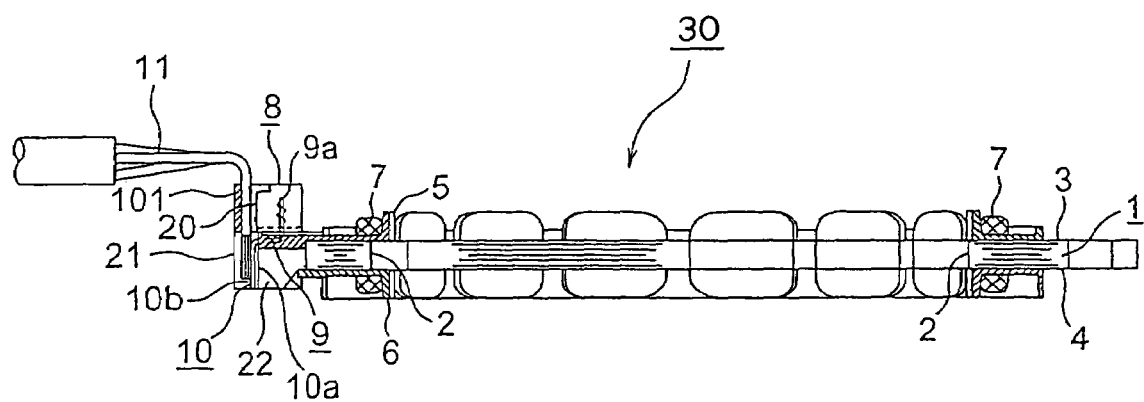
FIG. 2 is a cross sectional view of the structure illustrated in FIG. 1.
Figure 3:
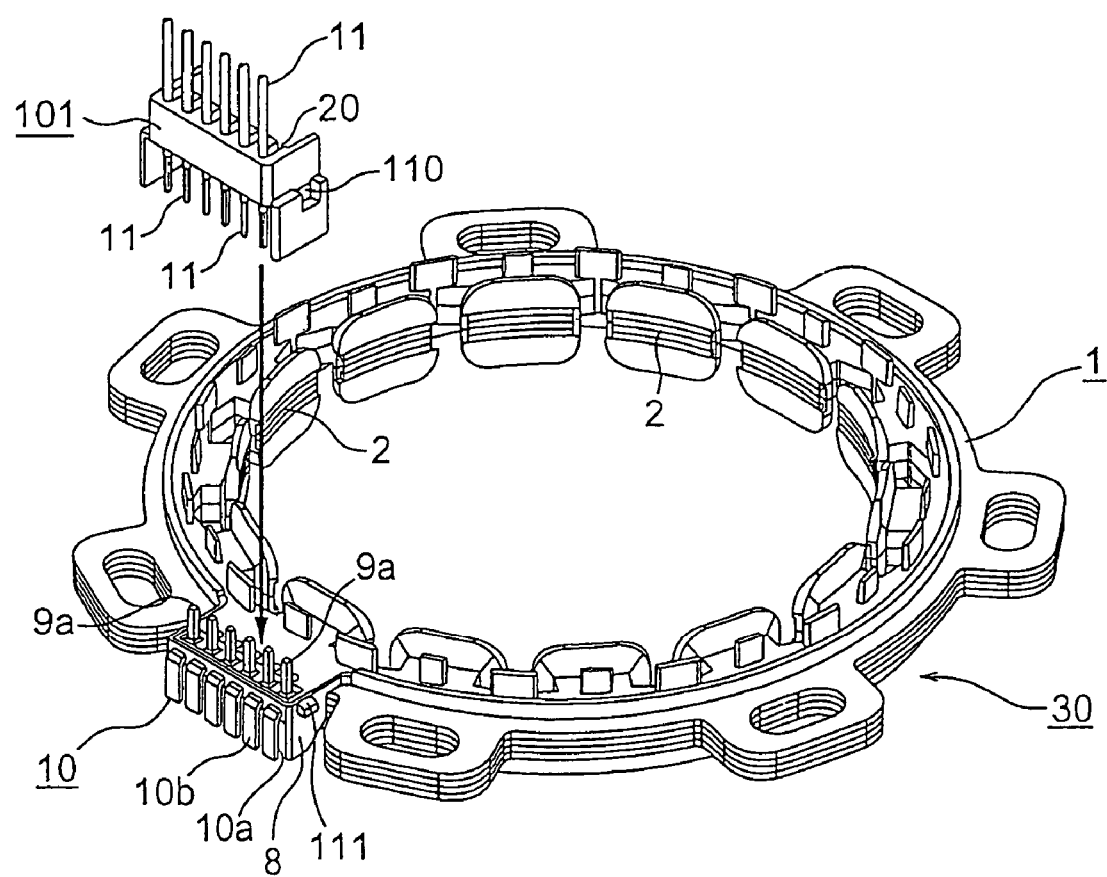
FIG. 3 is an exploded perspective view of the structure illustrated in FIG. 1 before lead connection.
Figure 4:
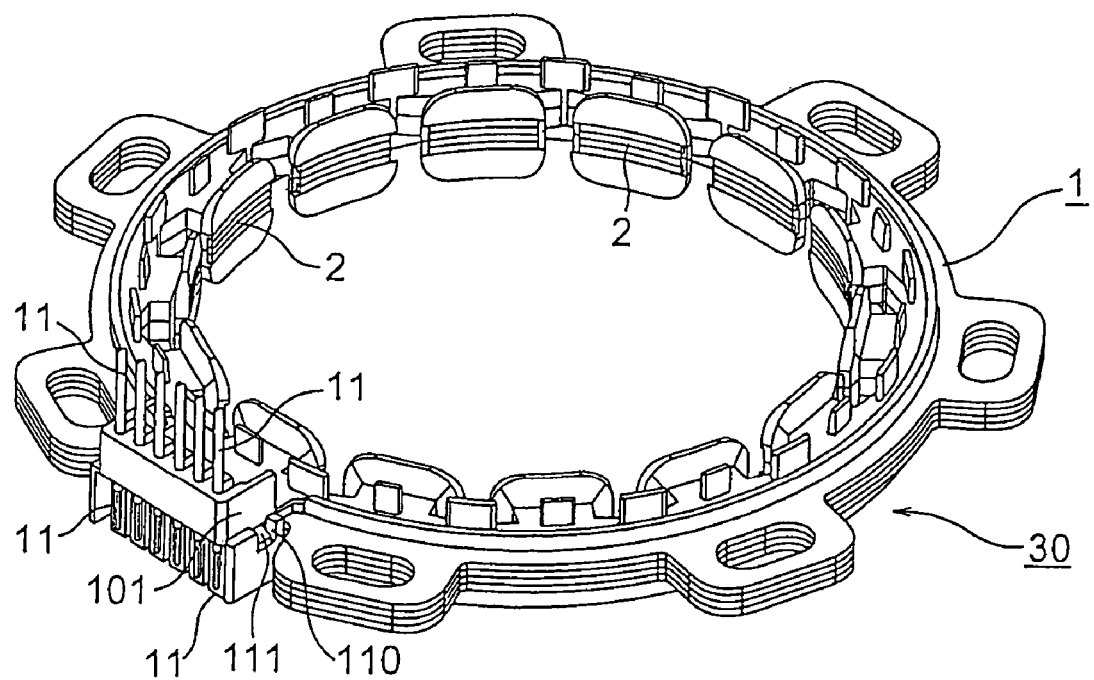
FIG. 4 is a perspective view of the structure shown in FIG. 1 after lead connection.

In FIGS. 1 and 2, reference numeral 1 denotes a ring-shaped stator having a plurality of salient poles 2 which protrude inwardly. An insulating cover 100 including first and second ring-shaped insulating covers 5 and 6, each of which has a shape covering the respective salient poles 2, is provided to first and second end surfaces 3 and 4 of the ring-shaped stator 1 by integral molding such as insert molding.

The respective salient poles 2 are wound with stator coils 7 through the respective ring-shaped insulating covers 5 and 6. A terminal pin holding part 8 is integrally formed with the insulating cover 100 by integral molding, and extends in a radial direction from a part of an outer edge of the insulating cover 100.

A plurality of terminal pins 9 which have a stepped shape are integrally provided in the terminal pin holding part 8 by insert molding or the like. Each of the coil connecting parts 9a is located at one end of each of the terminal pins 9. Each of the coil connecting parts 9a protrudes from the first end surface 3 side in an axial direction, and is connected with each of bundled end wires of the stator coils 7.

As shown in a cross sectional view of FIG. 2, the terminal pin 9 bent portion and a straight portion. A plate-shaped lead connecting portion 10 is extended downward from the terminal pin 9, that is, toward the second end surface 4 side in the axial direction to a side opposed to the coil connecting part 9a.

Bundled end wires of the stator coils 7 are connected with the coil connecting parts 9a and then fixed thereto by soldering, welding, or the like. A box-shaped connection body 101, which includes leads 11 provided in lead guide holes 20, is formed above the terminal pin holding part 8. An engaging hole 110 of the connection body 101 is engaged with an engaging protrusion 111 of the terminal pin holding part 8 such that the connection body 101 is detachable from the terminal pin holding part 8.

The lead connecting portion 10 of the terminal pin holding part 8 has a structure particularly developed for the present invention. Openings 21 and 22 are formed at an outer surface 10b and an inner surface 10a of the lead connecting portion 10, so that the inner surface 10a and the outer surface 10b of the lead connecting portion 10 are exposed to an outside and formed in a flat plate shape. The openings 21 and 22 can be covered with, for example, caps which are not shown.

Next, assembly of a resolver using the resolver external conductor fixing structure according to the present invention will be described.

First, as shown in FIG. 1, until the end wires of the stator coils 7 are connected with the coil connecting parts 9a of the terminal pins 9 on an assembly line (not shown), the ring-shaped stator 1, which is automatically assembled and in which the respective salient poles 2 wound with the stator coils 7, is moved on the assembly line in a state in which the connection body 101 including the leads 11 is not connected with the terminal pin holding part 8.

Unlike conventional structures, the resolver stator 30 described above is assembled without performing a lead 11 connecting process, and is not connected with the lead 11 on the assembly line. Therefore, handling is easy and the automation of assembly is extremely facilitated.

In the resolver stator 30, after the above-mentioned assembly process is completed, the connection body 101 is mounted on the terminal pin holding part 8 in a state in which leads based on the user's specifications or, leads 11 corresponding to, for example, another harness, are inserted into the lead guide holes 20. A jig is inserted from the opening 21 or 22. The leads 11 are connected with and fixed to the lead connecting portion 10 by welding, soldering, or the like.

The invention claimed is:

1. A resolver external conductor fixing structure, comprising:
   a ring-shaped stator having a first surface and a second surface;
   an insulating cover including a first ring-shaped member integral with said first surface of said ring-shaped stator, and a second ring-shaped member integral with said second surface of said ring-shaped stator;
   a connection body including a plurality of leads;
   a terminal pin holding part integral with said insulating cover; and
   a plurality of terminal pins disposed in said terminal pin holding part, each of said terminal pins having a coil connecting portion, a lead connecting portion which protrudes from said terminal pin holding part so as to be exposed, and a step portion adjoining said coil connecting portion and said leading connecting portion such that said coil connecting portion is spaced radially outward of said lead connecting portion, wherein
   said coil connecting portion extends from said first surface of said ring-shaped stator in an axial direction, and said lead connecting portion extends toward said second surface of said ring-shaped stator in an opposite axial direction, and said connection body and said terminal pin holding part are configured to detachably engage to allow said plurality of leads to be connected with said lead connecting portions of said plurality of terminal pins.

2. The resolver external conductor fixing structure according to claim 1, wherein each of said lead connecting portions includes an outer surface and an inner surface extending toward said second surface of said ring-shaped stator in the opposing axial direction, said outer and inner surfaces being exposed so as to be connectable with said plurality of leads.

3. The resolver external conductor fixing structure according to claim 1, wherein each of said lead connecting portions has a flat plane shape.

4. The resolver external conductor fixing structure according to claim 1, wherein said connection body comprises a plurality of lead guide holes formed therein, for guiding said plurality of leads.

5. The resolver external conductor fixing structure according to claim 1, wherein said coil connecting portion is disposed in a first plane, and said lead connecting portion is disposed in a second plane which is parallel to said first plane.

* * * * *